(12) United States Patent
Douglas et al.

(10) Patent No.: US 8,899,188 B1
(45) Date of Patent: Dec. 2, 2014

(54) LIGHTWEIGHT PORTABLE LIFT/RAMP DEVICE FOR PETS

(76) Inventors: Brian Douglas, Knoxville, TN (US); Debra Douglas, Knoxville, TN (US); Ben Nibali, Maryville, TN (US); Jerome W. Tester, Knoxville, TN (US)

( * ) Notice: Subject to any disclaimer, the term of this patent is extended or adjusted under 35 U.S.C. 154(b) by 309 days.

(21) Appl. No.: 13/604,231

(22) Filed: Sep. 5, 2012

Related U.S. Application Data

(60) Provisional application No. 61/531,774, filed on Sep. 7, 2001.

(51) Int. Cl.
*B65G 69/30* (2006.01)

(52) U.S. Cl.
USPC ............. 119/849; 119/847; 182/113; 14/69.5

(58) Field of Classification Search
USPC ............ 119/847–849; 14/69.5; 414/467, 921; 296/61; 182/113
See application file for complete search history.

(56) References Cited

U.S. PATENT DOCUMENTS

| | | | | |
|---|---|---|---|---|
| 788,424 | A * | 4/1905 | Oohs .............................. | 119/849 |
| 1,587,348 | A * | 6/1926 | Myers ........................... | 119/849 |
| 1,733,517 | A * | 10/1929 | Siddens ......................... | 119/849 |
| 1,946,000 | A * | 2/1934 | Samuels ........................ | 119/849 |
| 2,584,396 | A * | 2/1952 | Naekel .......................... | 119/849 |
| 3,666,045 | A * | 5/1972 | Olsen ............................ | 182/113 |
| 5,924,383 | A * | 7/1999 | Smith ........................... | 119/847 |
| 6,725,487 | B2 * | 4/2004 | Myrick et al. ................ | 119/849 |

* cited by examiner

*Primary Examiner* — David Parsley
*Assistant Examiner* — Marc Burgess
(74) *Attorney, Agent, or Firm* — Global IP; Esther Roberts Bell

(57) ABSTRACT

The present general inventive concept relates generally to an animal lift, and more particularly to a portable, lightweight ramp device with collapsible side panels to eliminate the visual cliff perceived by a user animal.

4 Claims, 8 Drawing Sheets

LIGHTWEIGHT PORTABLE LIFT/RAMP DEVICE FOR PETS

CROSS-REFERENCE TO RELATED APPLICATIONS

This Application claims the benefit of U.S. Provisional Application 61/531,774, filed Sep. 7, 2011.

STATEMENT REGARDING FEDERALLY-SPONSORED RESEARCH OR DEVELOPMENT

Not Applicable.

BACKGROUND OF THE INVENTION

This invention relates generally to an animal lift, and more particularly to a portable, lightweight ramp with collapsible side panels to eliminate the visual cliff perceived by a user animal.

Various types of animal ramp apparatus have long been used for moving large animals from one elevation to another. Such apparatus include, for example, loading ramps made of wood, metal, cementitious materials, other types of materials, or some combination of materials, such as, for one example, a concrete ramp with metal rails on the sides. Some examples of typical usages for such devices include loading domesticated livestock into transport vehicles—such as cattle into rail cars or horses into horse trailers—or providing access between two different elevations for exotic large animals, such as tigers from a fabricated den out onto an enclosure floor, or hippopotamuses from a dry bank into a water pool. Some animals of more modest size still often require the use of some type of ramp apparatus for transport and/or elevational change. Relevant examples of such animals would be pigs and geese. In the vast majority of these instances, the lift device, or ramp, is stationary, due to the size, weight, and mass required to construct a device of sufficient substance to support the weight of the creatures who utilize it. One alternative to a stationary ramp is a semi-stationary ramp, such as a loading ramp attached to horse transport vehicles. Typically, these ramps are fixedly hinged to the end of the trailer and fold down to load or off-load the animal(s), then raise up and latch to the end of the trailer so the trailer is safely mobile.

The lift devices discussed above, however, are not designed for use in facilitating elevational change for companion animals. The above-described devices are impractical for use with pets, as those devices are too large, heavy, bulky or some combination of all three, plus those devices usually cannot be moved with any ease, nor can they be easily adapted to residential-based use or automobile-based use.

The need for a lightweight portable lift device for pets has increased dramatically in recent years. There are several reasons for this rise.

First, older pets are no longer viewed as expendable by many human owners. Instead of euthanizing a geriatric pet who may have mobility limitations, oftentimes owners seek various devices that can assist their pet so as to maximize the quality of life for both animal and owner, such as, in some instances, detachable wheels that may be strapped to the animal to provide a mechanical means of independent movement when one or more limbs are no longer functional. Examples of instances when a lightweight portable lift device is of particular use would be assisting a pet's ingress and egress from a vehicle or a home. In similar fashion, such a device could be extremely useful within the home, for allowing the pet to change elevations, such as from the floor to a sofa, chair, etc.

Second, companion animals are viewed as life-enhancing to many humans, even when the human him/herself is physically impaired so as to be unable to lift a pet—irrespective of the pet's age and/or physical abilities—into and out of a vehicle, onto and off of an elevated surface, such as grooming table, etc.

One significant challenge when utilizing a lift device for elevation change with pets or companion animals is the animal's natural disposition to avoid a perceived "visual cliff." This phenomenon is triggered by a perceived fear of falling off the edge of an elevated surface and is often exhibited as fear and aversion to accessing the elevated surface. Most animals have this natural aversion to visual cliff stimulus, such as ramps, stairs, lifts, ledges and edges (e.g., table edges); this aversion is often manifested in the animal in such physiological and psychological responses such as elevated breathing, panting, crouching, scratching, clawing, or pawing, shaking, shivering, pulling away from a handler, and/or complete immobility. In certain circumstances with pets and companion animals, such as on a veterinary examination table, the aversion to visual cliff stimuli may be utilized to effectively immobilize the pet during an examination without additional restraints and/or anesthesia. However, for purposes of daily elevational changes, such as, for one example, loading a dog into and out of a car to take it to a dog park for daily exercise, there exists a need for a lightweight portable lift device that overcomes a user animal's fear of the visual cliff and that pet owners can use with relative ease.

BRIEF SUMMARY OF THE INVENTION

Example embodiments of the present general inventive concept provide an animal lift device in the form of a portable, lightweight ramp with collapsible side panels to eliminate the visual cliff perceived by a user animal. The present invention, in some of its various embodiments, can consist of a single ramp piece, or it can contain a plurality of ramp pieces pivotally or telescopically connected to one another so as to achieve a single ramp unit.

Once the single ramp piece or unit is positioned in place, the side panels may be extended. The side panels and their components can be housed in a side frame along each side of each ramp piece. Each side frame contains two bars, which are tubular in some embodiments; the bars are pivotally connected to the frame. When the ramp is being stored or transported, the tubular bars can be folded into the side frames along each ramp piece. Contrastingly, when the ramp is in use, the tubular bars fold vertically to become perpendicular to the ramp. In some embodiments, a horizontal member, aligned parallel to the ramp, is then raised on each side of each ramp piece. The tubular bars permanently penetrate each end of the horizontal member, permitting the horizontal member to be raised only when the tubular bars are perpendicular to the ramp and the horizontal member. In these embodiments, once raised, the horizontal member is detachably secured atop both tubular bars. In some embodiments, the tubular bars can contain an indention or cut that provides a surface contact fit with the outer diameter or dimension of the horizontal member. In some embodiments, the tubular bars can contain a protrusion, notch or attachment; in these embodiments, the horizontal members are raised above such protrusion, notch or attachment and then allowed to rest thereupon while the unit is deployed.

In some embodiments, attached to both the horizontal members and the side frames are side panels. In some embodiments, these side panels can be made of a flexible, opaque material. In some embodiments, when the horizontal member is detachably secured in place atop the tubular bars, the side panels are also positioned for use by virtue of the horizontal member being raised above the side frame.

Alternative embodiments of the present general inventive concept can feature the side panels attached so as to be positioned for use by virtue of the side frames being placed upright and the side panels opening to fill the area between the horizontal members and the side frames.

The present invention may be used in any number of applications to assist animals in their ascent or descent. Although not exclusive, these applications include stairways, beds, and automobiles. The user animals will not fear using the ramp, due to the opaque side panels blocking their peripheral view of any perceived edge to the ramp—the visual cliff. Viewing only the interior of the walled ramp and the target elevation (e.g., the interior of the car, top of the bed, etc.), the fear response typically associated with a visual cliff is not triggered, thus the avoidance behavior(s) associated with resistance to a visual cliff stimulus remain unmanifested, and the animal is much more willing to ascend or descend the ramp.

Additional features and embodiments of the present general inventive concept will be set forth in part in the description which follows and, in part, will be obvious from the description, or may be learned by practice of the present general inventive concept.

BRIEF DESCRIPTION OF THE DRAWINGS

The above-mentioned and additional features of the invention will become more clearly understood from the following detailed description of the invention read together with the drawings in which.

DETAILED DESCRIPTION OF THE INVENTION

The following detailed description may recite various descriptive terms such as horizontal, vertical, top, bottom, upward, downward, left, right, etc., when referring to the exemplary figures, but the present general inventive concept is not limited to any such terms or physical orientations. Such terms are used for convenience of description only, and could be reversed, modified, or interchanged without departing from the broader scope and spirit of the present general inventive concept.

Figure 1:
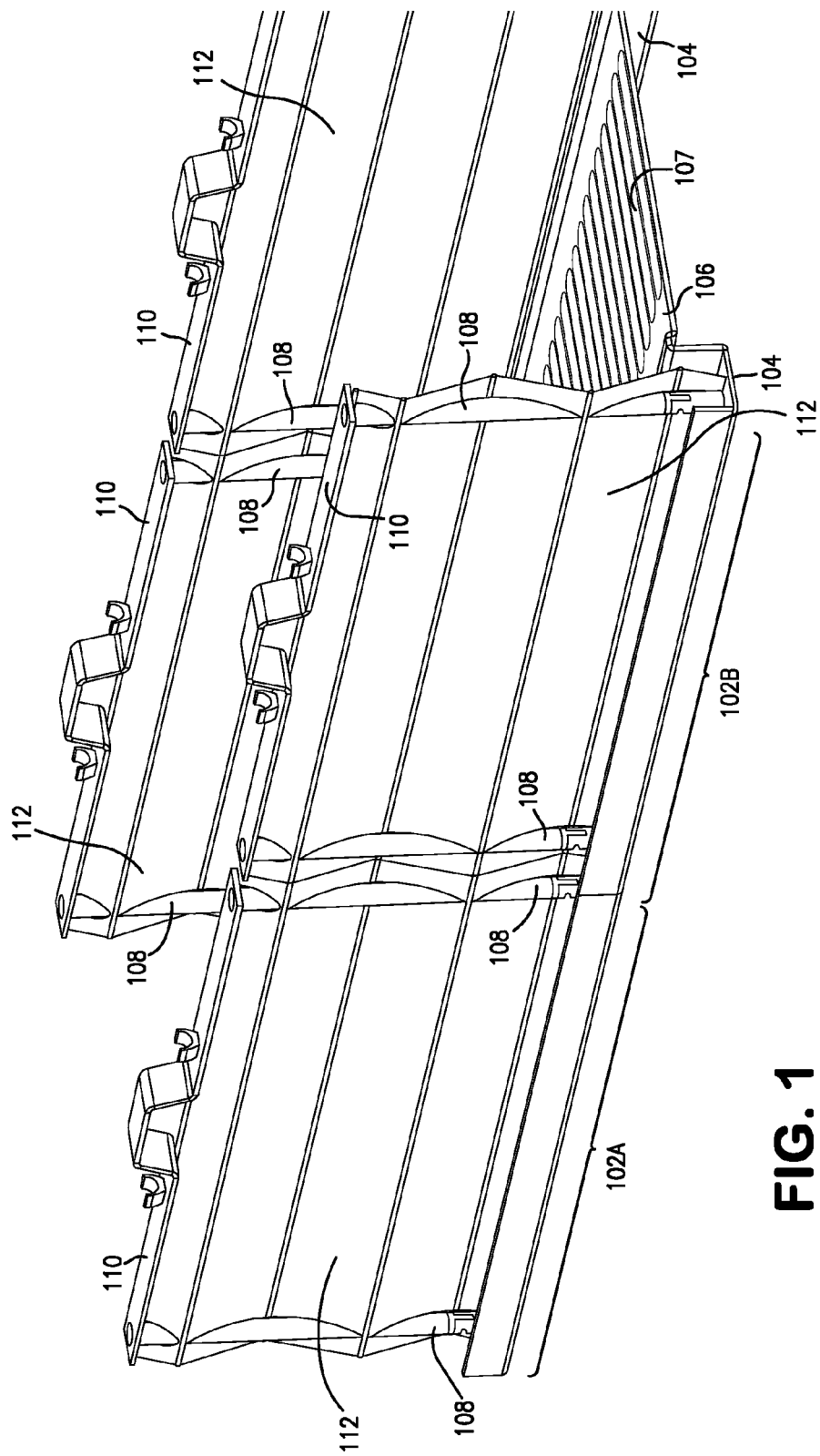
FIG. 1 is a diagram illustrating one embodiment of the present general inventive concept when fully deployed and ready for use by a user animal.

As illustrated in FIG. 1, some embodiments of the present general inventive concept can be comprised of at least two ramp pieces, shown at 102A and 102B. When in use, all ramp pieces 102A and 102B are aligned in a consecutive, linear fashion to create one ramp unit. Each ramp piece 102A and 102B contains a ramp deck 106 lined by two outboard side frames 104 on either side of ramp deck 106. Ramp deck 106 provides a surface that user animals can walk on. In some embodiments, optional grip surfaces 107 may be affixed to ramp 106 to provide additional traction for a user animal. In some embodiments, each side frame 104 houses collapsible side panels 112 and their associated components.

Still referring to FIG. 1, each side frame 104 (of each ramp piece 102A and 102B) houses at least two foldable tubular bars 108. Each tubular bar 108 is attached to the side frame 104 by a hinge that allows the tubular bars 108 to pivot from a flat position aligned with the directional orientation of each ramp piece 102A or 102B, to a vertical position as shown in FIG. 1. When both tubular bars 108 of a given side frame 104 are raised, a horizontal member 110 may be lifted and secured atop the tubular bars 108. Side panels 112 are attached to both the horizontal member 110 and the side frame 104. Therefore, by raising the horizontal member 110 and securing it atop at least two tubular bars 108, the side panels 112 are raised into position for a user animal. The tubular bars 108 and horizontal members 110 in the illustrated embodiment have a cross-sectional shape being that of a circle. Importantly, the both can also be formed with other cross-sectional shapes including, but not limited to, a rectangle, oval, or triangle.

Figure 2:
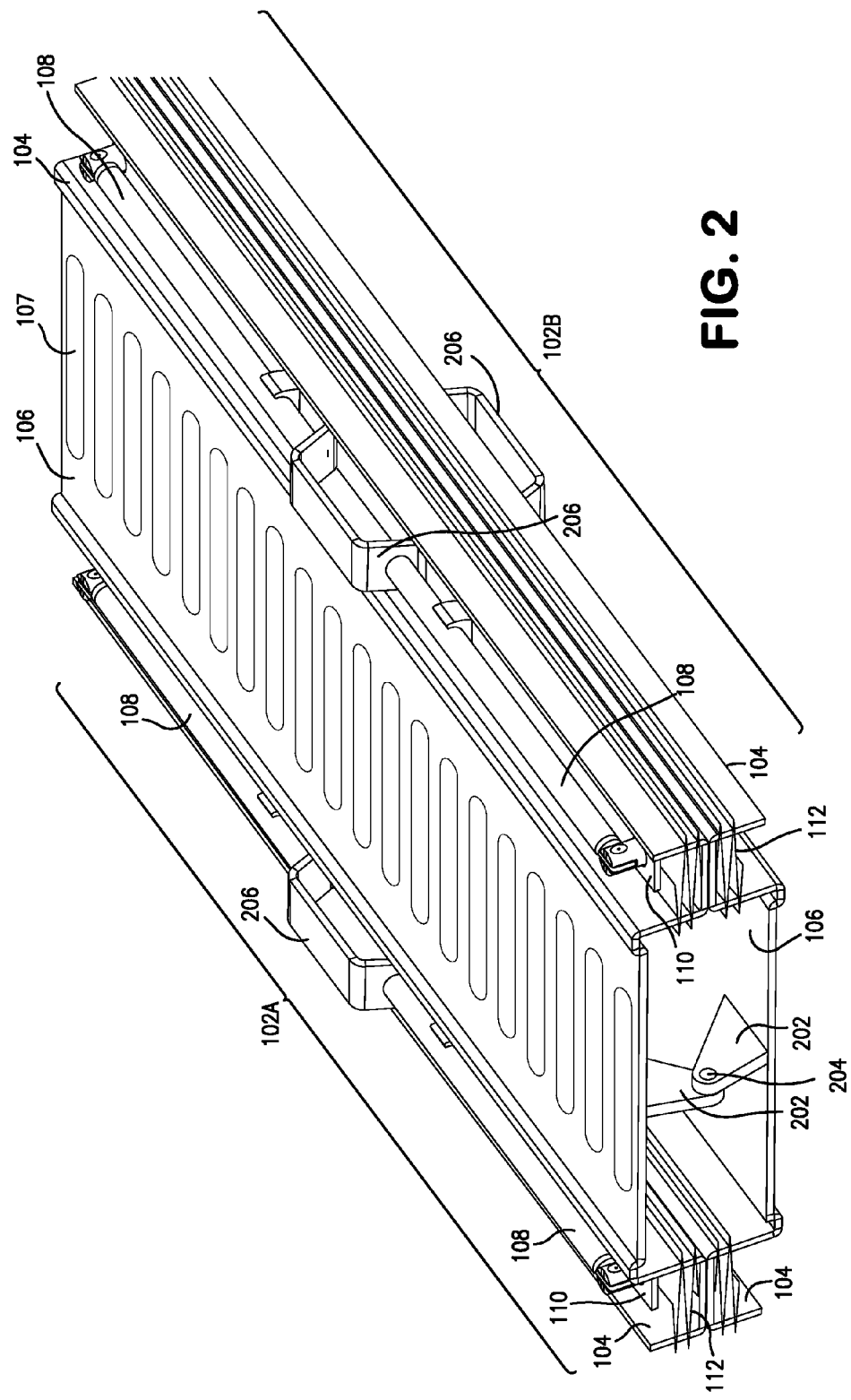
FIG. 2 is a diagram illustrating one embodiment of the present general inventive concept when collapsed and ready for transport or storage.

As illustrated in FIG. 2, ramp decks 106 have been folded on top of one another for portability, storage, or both. To achieve this transformation, each ramp piece 102A and 102B is connected to one another by a hinge assembly or other suitable means. Connected to the bottom surface of each ramp deck 106 is an extruding member 202. Both extruding members 202 are then attached to one another with a bolt or similar structure 204 to form the hinge assembly. Importantly, this assembly merely represents one embodiment of the present general inventive concept and can be modified to achieve similar results without deviating from the spirit and scope of the present inventive concept. For instance, the present inventive concept can also be achieved with multiple ramp pieces telescopically connected to one another.

In the portable or storage position portrayed in FIG. 2, the side panels 112, and their associated components, have been collapsed into the side frames 104. Specifically, the horizontal members 110 have been lowered and are at rest in the side frame 104. Consequentially, the side panels 112 have also been collapsed into the side frame 104 as well, due to the fact that the positions of the side panels 112 are dictated by the horizontal members 110. The tubular bars 108 have also been folded down into the side frames 104. The device's portability is also partly derived from the present of optional handles 206. If incorporated into a particular embodiment of the present general inventive concept, optional handles 206 are affixed atop each of the horizontal members 110.

Figure 3:
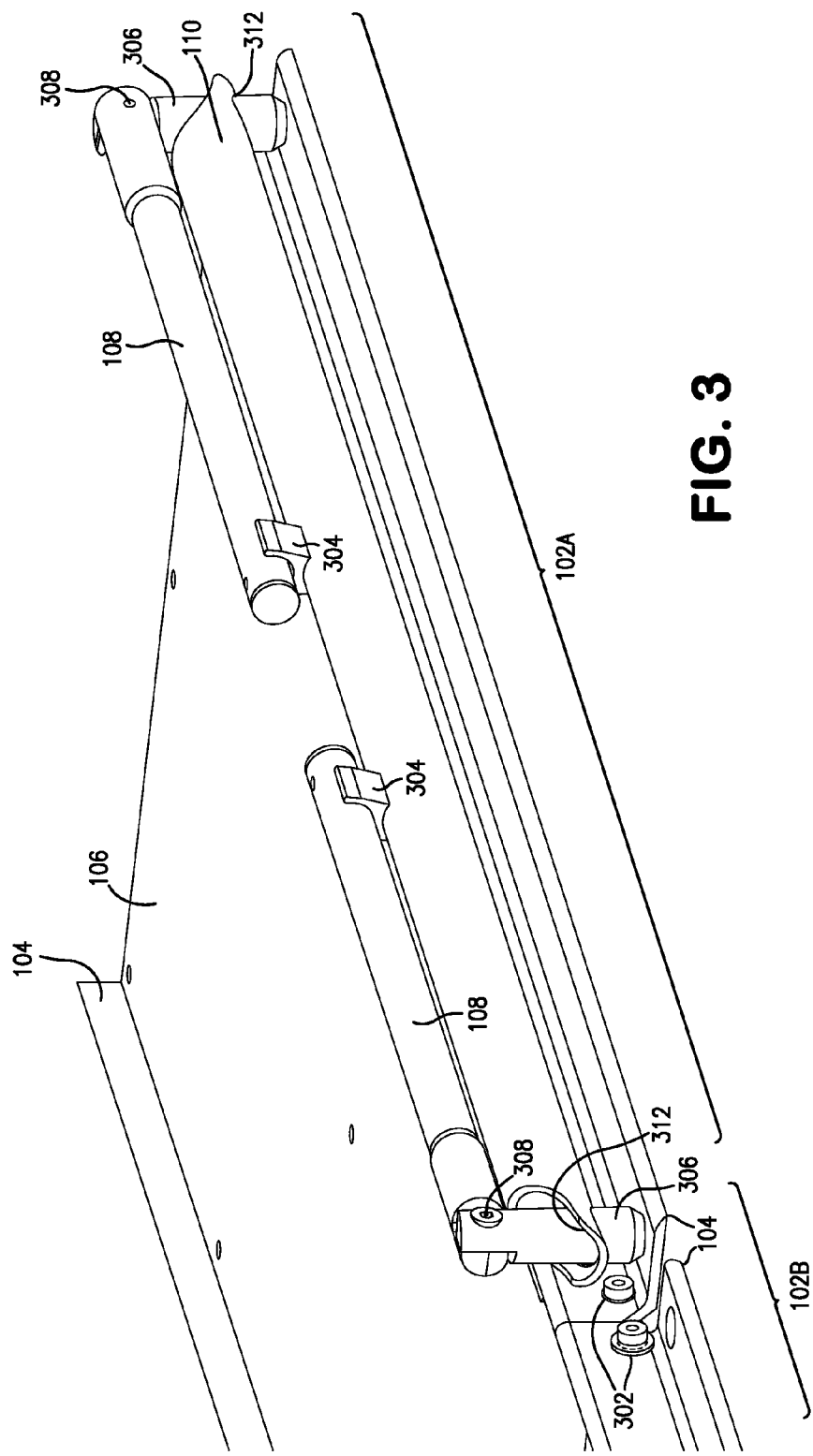
FIG. 3 is a diagram illustrating a partial view of one embodiment of the present general inventive concept with the side rails horizontally stored and ready to deploy vertically.

FIG. 3 illustrates a close up view of a side frame 104, tubular bars 108, and a horizontal member 110 in the collapsed position. The side panels 112 themselves, however, are not shown. The side frames 104 are also permanently attached to the ramp deck 106 of each ramp piece 102A and 102B. In some embodiments, this attachment can be achieved by a nut and bolt assembly as illustrated at 302. Many other variations of attachment means may be used, however, without deviating from the spirit and scope of the present general inventive concept. In some embodiments (not illustrated herein), the side frames can be integrally connected to the ramp deck such that the ramp deck and side frames are a single member.

Each tubular bar 108 engages within the side frame 104 via a base member 306, also shown in FIG. 3. The base members 306 are permanently connected to the side frames 104. The tubular bar 108 is attached to the base member 306 by a bolt 308, or other similar structure, which allows the tubular bar 108 to pivot along a single plane from its horizontal position shown in FIG. 3, to its vertical position shown in FIG. 4. When in the stored position shown in FIG. 3, in some embodiments, the tubular bars 108 can be secured in place against the horizontal member 110 by the support receivers 304, which can be permanently connected to the horizontal members 110.

Figure 4:
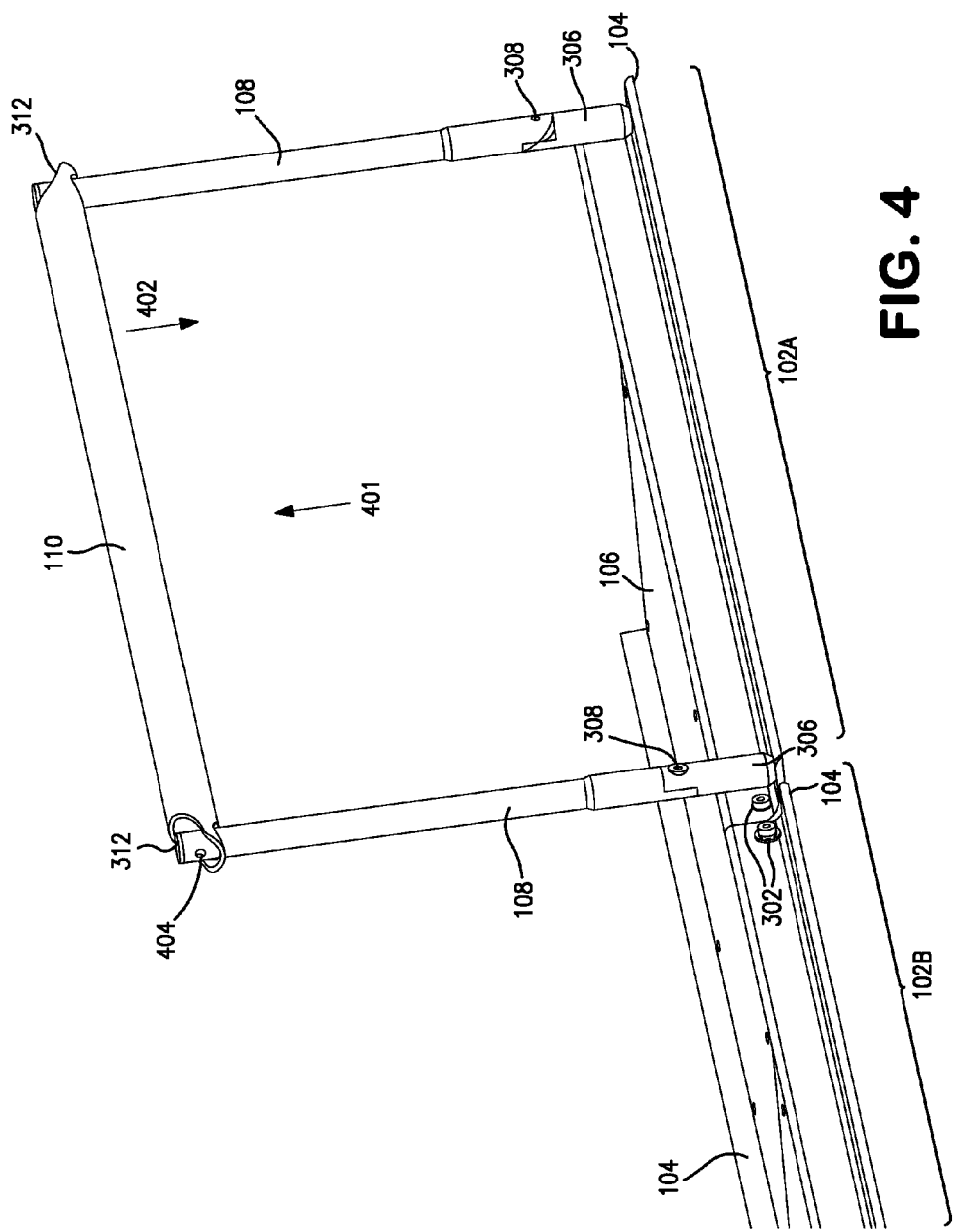
FIG. 4 is a diagram illustrating a partial view of one embodiment of the present general inventive concept where one series of side rails are vertically deployed, such that the correlative side panel would be extended if it were shown.

When the tubular bars 108 are pivoted to their vertical position, as shown in FIG. 4, they become perpendicular to the side frame 104 and the ramp deck 106. When both tubular bars 108 have been raised to this perpendicular position, the horizontal member 110 can be lifted up, as illustrated by directional 401. In some embodiments, optional handles 206 aid in the lifting process of horizontal member 110. The horizontal member 110 is lifted to a maximum height within the same horizontal plane as the terminal end of tubular bar 108. In some embodiments, the tubular bars 108 serve as a guide or track of sorts for the horizontal member 110 to be raised 401 and subsequently lowered, as illustrated by directional 402, as desired. In some embodiments, each end of each horizontal member 110 has defined therein a channel 312 to accommodate a tubular bar 108 as well as a base member 306. In FIG. 4, the channels 312 permit the horizontal member 110 to be raised up the tubular bars 108. Contrastingly, in FIG. 3, the horizontal member 110 is lowered into the side frame 104 and the channels 312 are accommodating the base members 306. The channels 312 permit the horizontal member 110 to come to rest between the base members 306 in a position that does not inhibit the pivoting of the tubular bars 108.

In some embodiments, the horizontal member 110 can be secured atop the tubular bars 108, as shown in FIG. 4. In some embodiments, a pin 404 is utilized to secure the horizontal member 110 into position atop the tubular bars 108 while the unit is deployed. In other embodiments, tubular bars 108 may have defined therein an indention or a cut in which channel 312 of horizontal member 110 rests while the unit is deployed, such as cut 802 shown in FIG. 8. Other embodiments may achieve the same result of securing the horizontal member 110 atop the tubular bars 108, without deviating from the spirit and scope of the present inventive concept. Although not shown in FIG. 4, when the unit is fully deployed, side panels 112 would also be in position for use in FIG. 4

Figure 5:
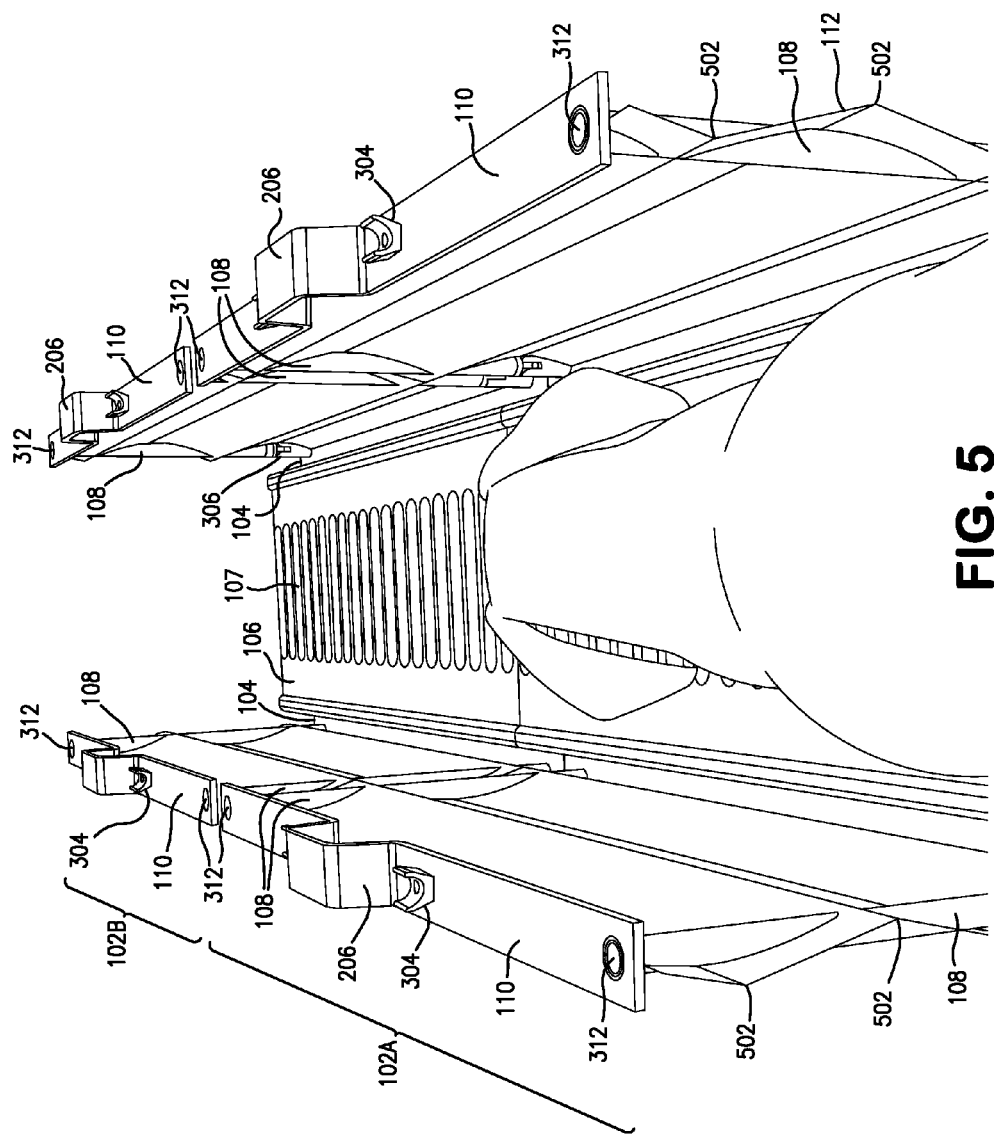
FIG. 5 is a diagram illustrating one embodiment of the present general inventive concept when fully deployed and in use by a user animal.

FIG. 5 illustrates the present general inventive concept when fully deployed in its functional position. Both ramp pieces 102A and 102B are aligned in a consecutive, linear fashion thus creating one ramp unit. All tubular bars 108 have been elevated to their vertical positions, perpendicular to their respective side frame 104, and all horizontal members 110 have been lifted and secured atop their respective tubular bars 108.

As shown in FIG. 5, once the tubular bars 108 have been elevated to their vertical positions, and all horizontal members 110 lifted and secured atop their respective tubular bars 108, the side panels 112 are positioned for use to prevent the visual cliff apprehensive response in a user animal. In some embodiments, side panels 112 are made of a manipulatable, opaque material. The material can be cloth, polymer, or any other type of manipulatable material. In some embodiments, the material is foldable and is periodically creased 502 to accommodate efficient stowage and storage in side frames 104. Creasing 502 the material of side panel 112 is only one way to achieve alignment with side frame 104. Other means can also be used that will not deviate from the present general inventive concept. For instance, another embodiment, not shown, includes stiffening rods affixed to each side panels, such as, for one example, via being sewn into horizontal pockets that span the side panel. In this and similar embodiments, the stiffening rods direct the manipulatable material into the side frames 104 when the side panels 112 are collapsed. Optimally, the material used is opaque so that a user animal cannot see through it as the animal approaches and utilizes the present inventive concept. (see, e.g., FIG. 5)

Figure 6:
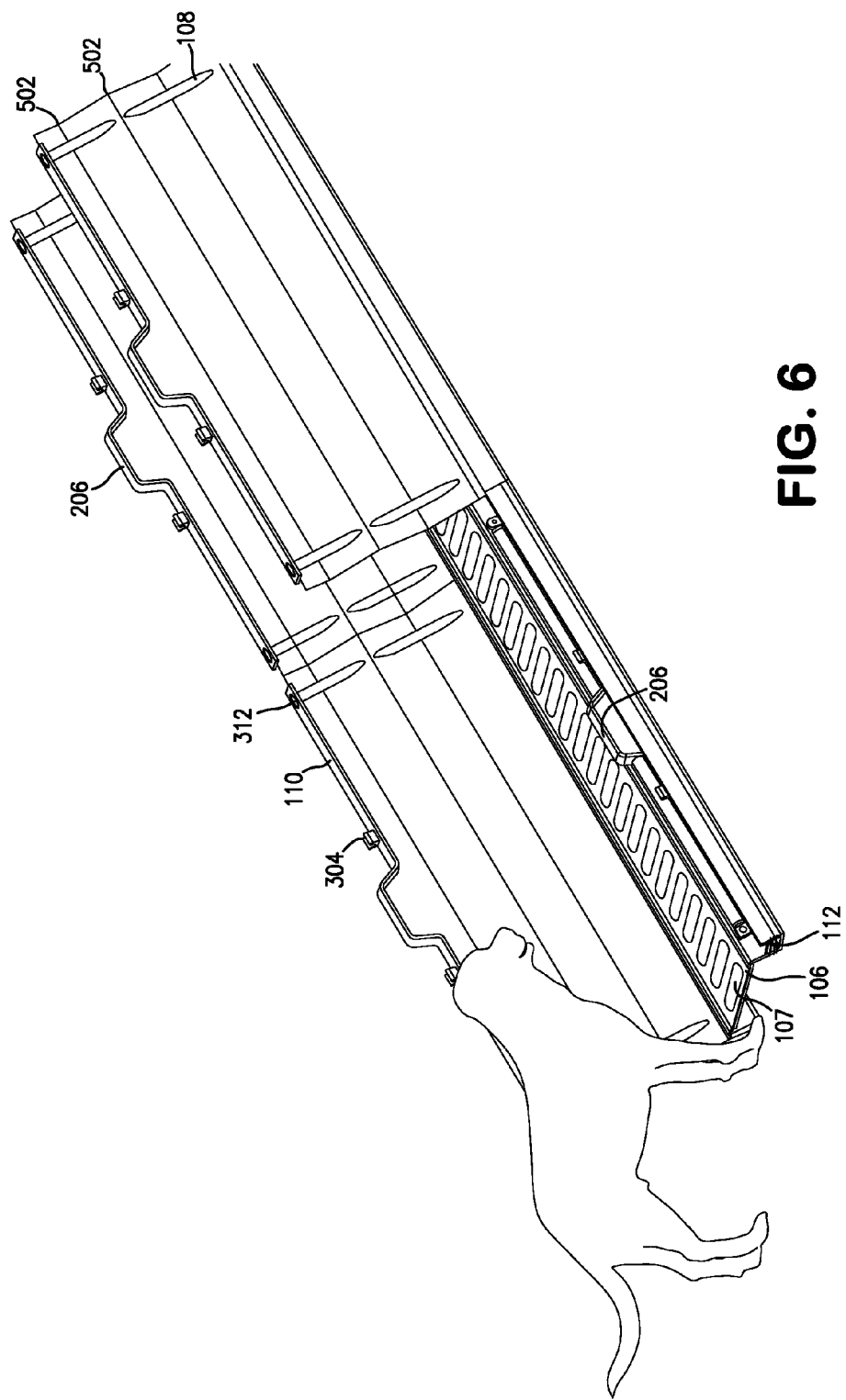
FIG. 6 is a diagram illustrating a partial side view of one embodiment of the present general inventive concept when fully deployed and ready for use by a user animal.

FIG. 6 illustrates an embodiment of the present general inventive concept when fully deployed and ready for use by a user animal, such as, but not limited to, a canine. To assist with illustrative purposes, one side panel 112 is shown undeployed, but would be deployed when the apparatus is in use. Due to the side panels 112 restricting the user animals peripheral vision, the visual cliff apprehension responses should not be stimulated, and the user animal should willingly walk up ramp 106, featuring, in FIG. 6, optional grip surfaces 107. Optional handles 206 are shown in FIG. 6, as are optional folds 502 within the side panel 112 material. Also illustrated within FIG. 6 are tubular bars 108. In some embodiments, side panels 112 are designed so as to circumvent, either partially or wholly, the outside surface of tubular bars 108. In FIG. 6, side panels 112 partially circumvent tubular bars 108, thus the resulting partial view of tubular bars 108 when the side panel 112 is lifted and in place for use by a user animal.

Figure 7:
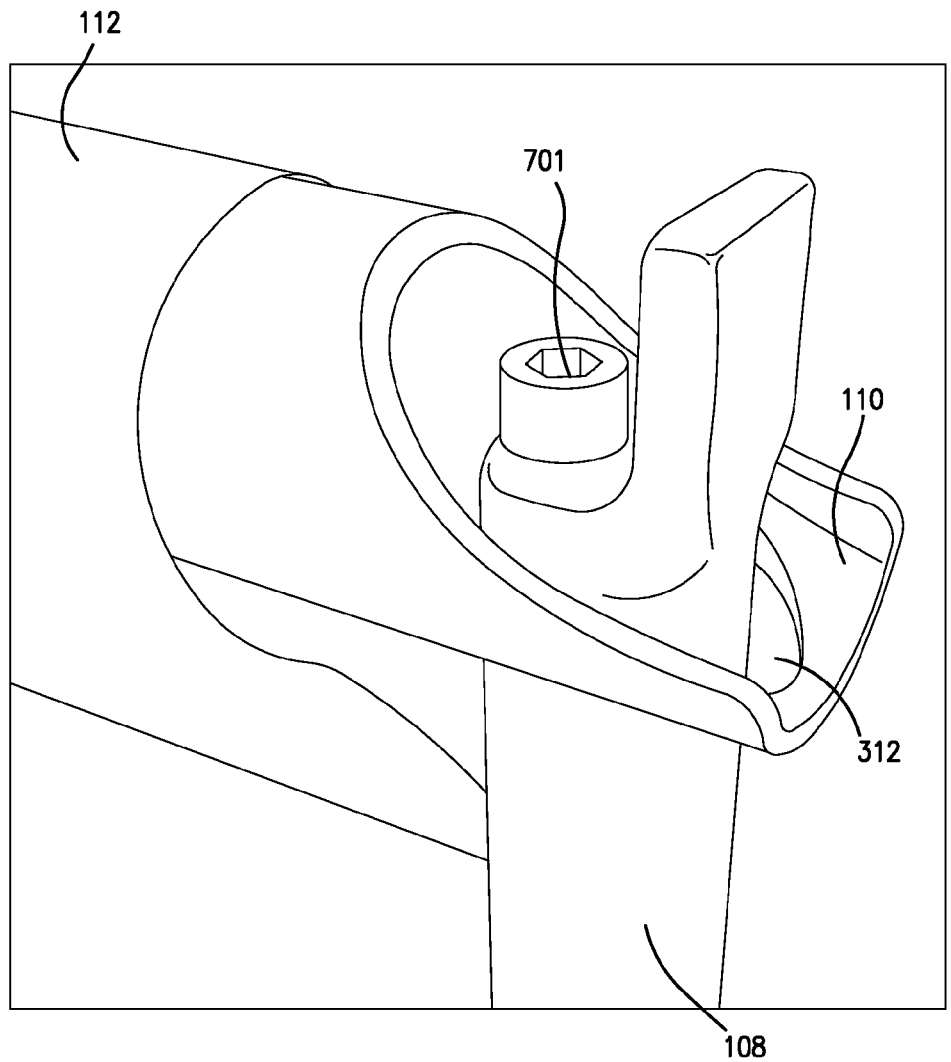
FIG. 7 is a diagram illustrating a partial and magnified view of one embodiment of the present general inventive concept.

FIG. 7 shows a close proximity view of tubular bar 108, horizontal member 110 and side panel 112 when the unit is deployed and ready for use. In this and similar embodiments, channel 312 is clearly visible as it encircles tubular bar 108. Also illustrated in FIG. 7 is an optional tab 701, which is affixed to tubular bar 108 so as to rest securely within support receiver 304 to keep tubular bar 108 is in its horizontal position when transporting or storing the ramp unit. In some embodiments, optional tab 701 is screwed into the end of tubular bar 108. This, however, is not the only way to achieve securing an optional tab 701 to tubular bar 108. Other means can include, as only some examples, welding, gluing, or brazing optional tab 701 to tubular bar 108, or mould-forming, such as, for one example, injection-molding optional tab 701 directly with tubular bar 108 as one unit.

Figure 8:
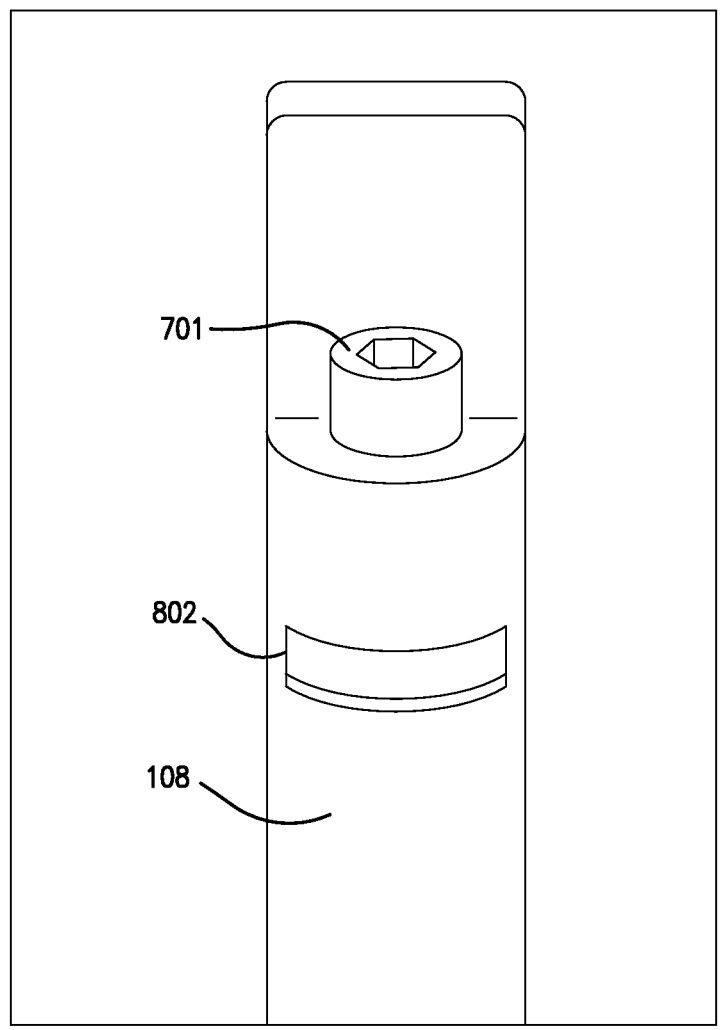
FIG. 8 is a diagram illustrating a partial and magnified view of one embodiment of the present general inventive concept.

FIG. 8 illustrates an exemplary embodiment of tubular bar 108. In this and similar embodiments, tubular bar 108 has defined upon its surface a ledge 802 for securing horizontal member 110 into place while the unit is deployed. In some embodiments, ledge 802 can be a cut into the surface of tubular bar 108; optionally, ledge 802 can be cut so as to allow for surface contact along the edges of ledge 802 between ledge 802 and channel 312 of horizontal member 110. In other embodiments, ledge 802 is defined as an intrusion or dent that does not breach the outer surface of tubular bar 108. In these embodiments, channel 312 of horizontal member 110 rests within ledge 802. In yet other embodiments, ledge 802 can be defined as a protrusion from the outer surface of tubular bar 108. In these embodiments, channel 312 of horizontal member 110 rests upon ledge 802. Many other variations of means to hold up horizontal member 110 while the unit is deployed may be utilized, however, without deviating from the spirit and scope of the present general inventive concept.

While the present general inventive concept has been illustrated by description of some embodiments, and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

It is also noted that numerous variations, modifications, and additional embodiments are possible, and, accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of several embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

What is claimed is:

1. A portable lift device for pets, comprising:
   a ramp assembly, said ramp assembly including a ramp deck and an outboard side frame along each side of said ramp deck, said side frames containing extendable and collapsible side panels;
   whereby said side panels shield a user animal from perceiving an elevation difference wherein:
   at least two base members are attached to each said side frame;
   a tubular bar is pivotally attached to each said base member such that said tubular bar may be rotated along a single plane from a position where it is aligned with said ramp piece and housed in said side frame, and a position where it is perpendicular to said ramp piece, extending vertically up from said side frame;
   a horizontal member disposed between said two base members containing a channel on each end penetrated by said base members and said tubular bars such that said horizontal member may be raised or lowered along said tubular bars and said base members; and
   a side panel, made of a lightweight, foldable, and opaque material attached to each said side frame and said horizontal member such that said side panel is either raised or lowered according to the position of said horizontal member.

2. A portable lift device for pets, comprising:
   a plurality of ramp pieces pivotally connected to one another via a hinge assembly that permits said ramp pieces to be folded on top of one another or linearly aligned, said ramp pieces each containing a ramp deck and an outboard side frame along each side of said ramp deck, said side frames containing extendable and collapsible side panels;
   whereby said side panels shield a user animal from perceiving an elevation difference at least two base members are attached to each said side frame;
   a tubular bar is pivotally attached to each said base member such that said tubular bar may be rotated along a single plane from a position where said tubular bar is aligned with said ramp piece and housed in said side frame, and a position where said tubular bar is perpendicular to said ramp piece, extending vertically up from said side frame;
   a horizontal member is disposed between said two base members containing a channel on each end penetrated by said base members and said tubular bars such that said horizontal member may be raised or lowered along said tubular bars and said base members; and
   a side panel, made of a lightweight, foldable, and opaque material attached to each said side frame and said horizontal member such that said side panel is either raised or lowered according to the position of said horizontal member.

3. A portable lift device for pets, comprising:
   a plurality of ramp pieces telescopically connected with one another, said ramp pieces each containing a ramp deck and an outboard side frame along each side of said ramp deck, said side frames containing extendable and collapsible side panels;
   whereby said side panels shield a user animal from perceiving an elevation difference.

4. The portable lift device as in claims 1, 2 or 3, in which said tubular bar has defined thereupon a ledge for securing said horizontal member to said tubular bar.

* * * * *